United States Patent [19]

Dwyer et al.

[11] 4,364,231
[45] Dec. 21, 1982

[54] COMPOUND MASTER BRAKE CYLINDER

[75] Inventors: Robert M. Dwyer, Livonia; Edwin J. Skiba, Sterling Heights, both of Mich.

[73] Assignee: Massey-Ferguson Inc., Detroit, Mich.

[21] Appl. No.: 142,944

[22] Filed: Apr. 23, 1980

[51] Int. Cl.³ .............................................. B60T 11/02
[52] U.S. Cl. ........................................ 60/577; 60/578
[58] Field of Search ................. 60/574, 576, 577, 578, 60/585

[56] References Cited

U.S. PATENT DOCUMENTS

| | | | |
|---|---|---|---|
| 2,463,062 | 3/1947 | Seppmann | 60/578 |
| 2,508,403 | 5/1950 | Knauss | |
| 3,228,195 | 1/1966 | Brent | |
| 4,249,380 | 2/1981 | Melendy | 60/577 |

FOREIGN PATENT DOCUMENTS 480045 4/1953 Italy ...................................... 60/576

OTHER PUBLICATIONS

Mico Manual, No. 84-001-002; Service Manual for Mico Power Cylinders; 5/1974.

*Primary Examiner*—Abraham Hershkovitz
*Attorney, Agent, or Firm*—John C. Thompson

[57] ABSTRACT

A compound master brake cylinder assembly (10) for a braking system, the cylinder assembly having a reservoir (34), a first low pressure cylinder (72), and a removable high pressure cylinder (58). A relief valve (84) is provided with a poppet valve (104) normally biased to a closed position. The relief valve (84) extends between the low pressure cylinder (72) and reservoir (34) and is responsive to first cylinder (72) pressure and outlet pressure through pilot passageways (114 and 111, respectively) to vent fluid from cylinder (72) to reservoir (34) to progressively reduce the pressure in the cylinder to insure that the force applied by push rod (14) does not substantially vary while cylinder (72) pressure is being reduced after outlet pressure exceeds a predetermined position.

3 Claims, 3 Drawing Figures

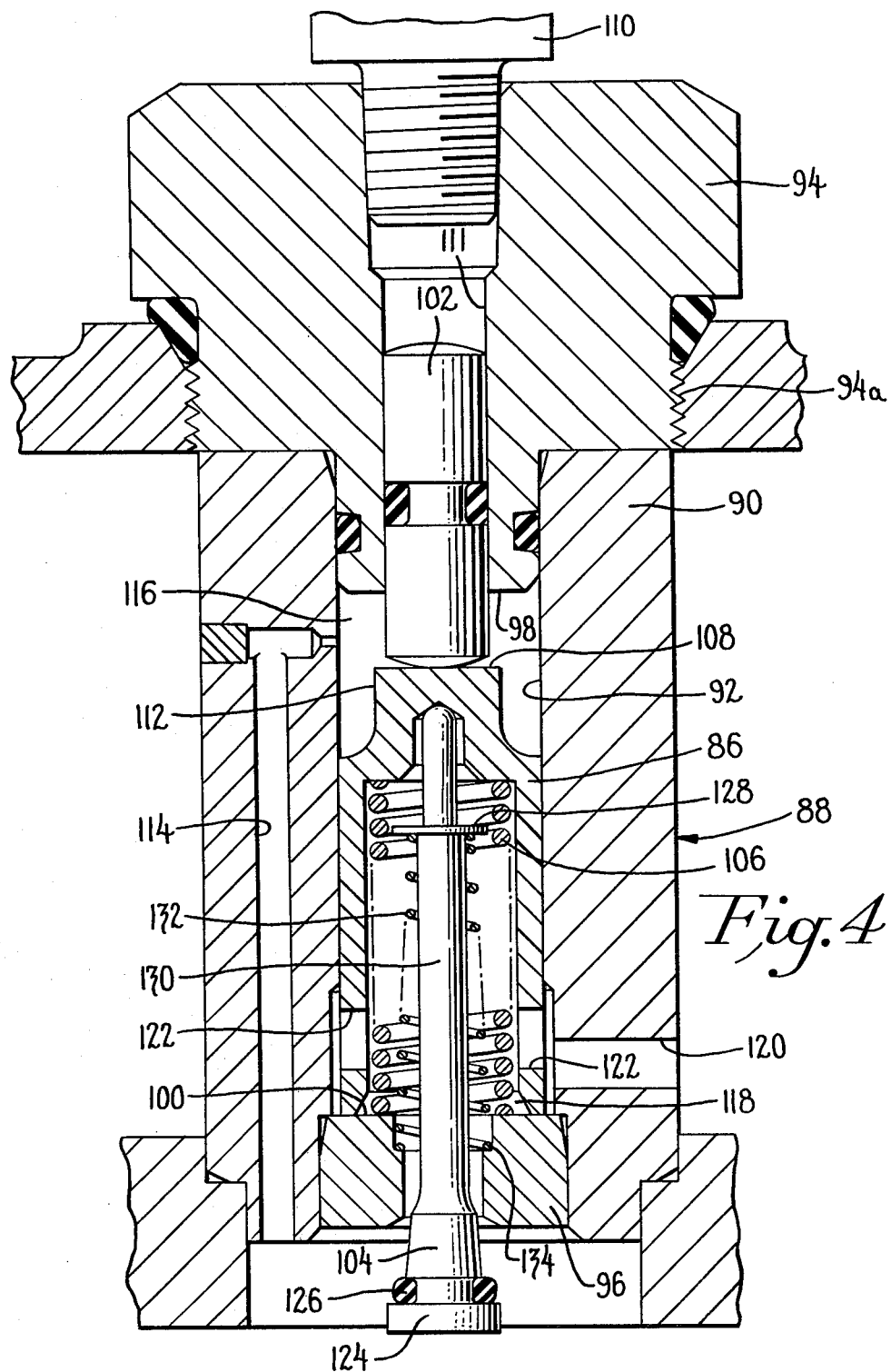

COMPOUND MASTER BRAKE CYLINDER

FIELD OF THE INVENTION

The present invention relates generally to a hydraulic braking system, and more particularly to a compound master brake cylinder of the type operated by a foot pedal or the like which has both good pedal feel and good ergonomic efficiency.

BACKGROUND ART

It is well known in the prior art to provide compound master brake cylinder assemblies for hydraulic braking systems. These master cylinders have a large diameter piston which initially displaces a high volume of fluid under relatively low pressure, and an associated piston of smaller diameter capable of displacing a relatively low volume of fluid at high pressure. The purpose of such systems is to insure that the brake shoes (or pads) quickly engage the associated drum (or disc), and after engagement operate through the high pressure low diameter cylinder to apply the braking force. The reason that such systems are desirable is that when an operator applies the braking force it is necessary for the cylinder within the system to operate within the operator's physical limitations. Thus, if the operator were operating solely through a large diameter piston when the brake shoes start to engage it would be necessary for him to apply a much greater force in order to bring the vehicle associated with the system to a stop. This becomes more of a problem as the weight of the vehicle increases. On the other hand, if the operator were operating solely through a small diameter high pressure piston arrangement the brake pedal travel would be unnecessarily great.

One of the problems associated with the compound master brake cylinder is maintaining relatively uniform brake pedal force, particularly during the transitional phase between the operation of the large diameter low pressure piston and the small diameter high pressure piston. Thus, it is desirable that no input pressure peaks or valleys be encountered during the operation of the brake pedal. On the other hand, it is also desirable that the pressure within the chamber behind the large diameter piston be reduced to the lowest possible level as quickly as possible in order to insure good operator efficiency.

In the past, various proposals have been made which attempt to solve these problems. One example is U.S. Pat. No. 3,228,195 issued Jan. 11, 1966. While the design shown in this patent will apparently reduce the pressure in the chamber behind the large diameter piston to provide good operator efficiency when it is necessary for only the small diameter high pressure piston to operate, the pedal effort does not remain relatively uniform, particularly during that portion of the operation of the master cylinder when fluid pressure in the chamber behind the large diameter piston is being reduced. Another example is U.S. Pat. No. 2,508,403 issued May 23, 1950. While this design will maintain more uniform pedal effort, it will not reduce the pressure behind the large diameter piston as quickly as possible while maintaining uniform pedal effort. In addition, this design is only usable with compound master brake cylinders of the type having a fixed high pressure cylinder which receives a movable piston.

OBJECTS AND SUMMARY OF THE INVENTION

It is an object of the present invention to provide an improved compound master brake cylinder assembly for a braking system, the cylinder being of the type operated by a brake pedal or the like, and the cylinder assembly providing good ergonomic efficiency with relatively uniform pedal effort throughout the operating range of the master brake cylinder assembly.

The above object, and other objects and advantages of this invention are accomplished by providing a pilot operated relief valve operatively associated through a first pilot line with the fluid chamber of the large diameter low pressure cylinder of the compound master brake cylinder assembly and through a second pilot line with the outlet of the master brake assembly, the relief valve including a poppet valve capable of venting fluid from the chamber to the reservoir while progressively reducing the pressure in the chamber behind the large diameter piston to insure that the force applied by the brake pedal or the like does not substantially vary while the large diameter piston chamber pressure is being reduced.

The above and additional details are more fully set forth in the following detailed description and accompanying drawings.

BRIEF DESCRIPTION OF THE DRAWINGS

FIG. 4 is an enlarged sectional view of the relief valve illustrated in FIG. 3 showing the relationship of the parts when the brakes are applied.

DETAILED DESCRIPTION

Figure 1:
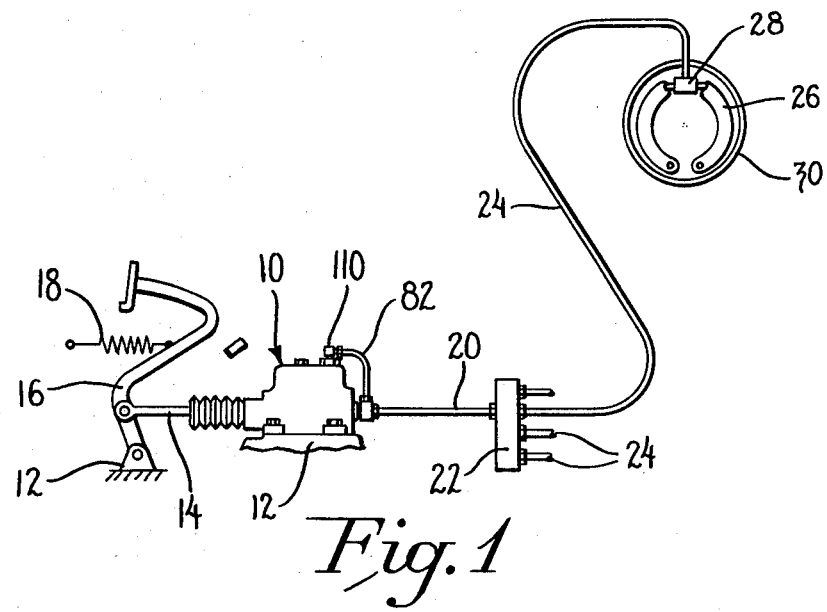
FIG. 1 is a diagramatic illustration of a hydraulic braking system including the compound master brake cylinder assembly of the present invention.

Referring first to FIG. 1, a hydraulic braking system is illustrated in which the compound master brake cylinder assembly of this invention is incorporated. The system includes the master brake cylinder assembly, indicated generally at 10, which is mounted on a support 12 which is a part of a vehicle. The master cylinder is operated through a push rod 14 which is pivotally secured to a brake pedal assembly 16 which is in turn pivotally mounted on a support 12. The brake pedal is normally biased to a stop position by spring 18 but can be shifted to the right as viewed in FIG. 1 to apply the brakes. The master cylinder is provided with an outlet 20 which is interconnected through a manifold 22 to a plurality of brake lines 24. While the vehicle is provided with a plurality of braking elements only one is shown, this being in the form of brake shoes 26 which are operated through a brake cylinder 28, the shoes engaging a brake drum 30. While brake drums and brake shoes are illustrated, it should be appreciated that the invention may also be applied to a braking system employing disc brakes.

Figure 3:
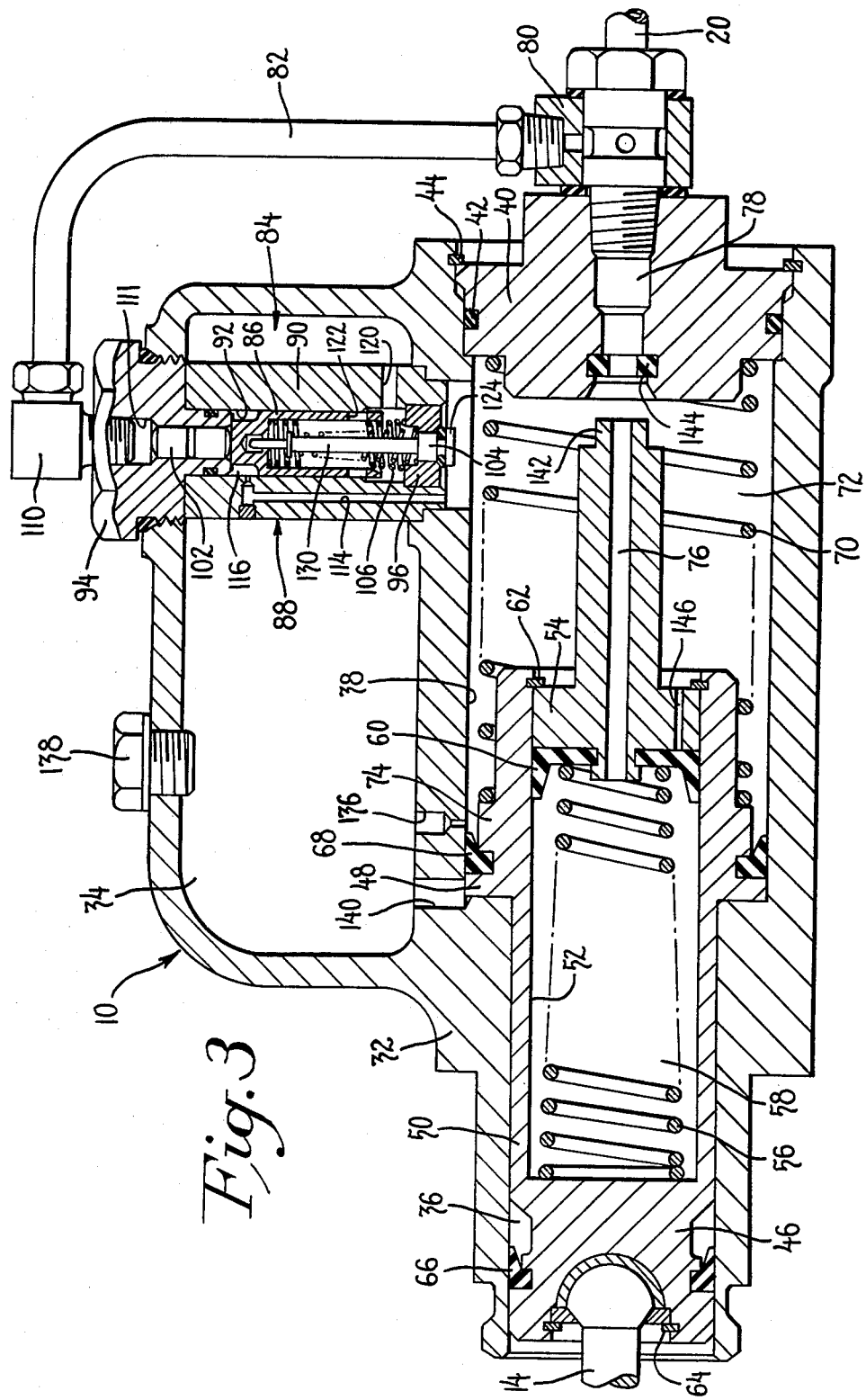
FIG. 3 is a cross-sectional view of the compound master brake cylinder assembly of this invention illustrating the relationship of various parts before the brakes are applied.

FIG. 3 illustrates the master cylinder assembly when the push rod 14 and brake pedal assembly 16 are in their retracted position. The brake cylinder assembly includes a casting 32 which is provided with an upper reservoir 34 and two coaxial lower cylindrical bores 36 and 38 of differing diameters. The right hand bore 38 is closed by a plug 40 provided with an O-ring 42, and is held in place against a shoulder by a snap ring 44. Disposed within the bores is a first piston 46. The first piston has an enlarged portion 48 disposed within the first cylindrical bore 36, and a reduced diameter portion 50 disposed within the bore 38. The portions 48 and 50 are coaxial and are provided with another cylindrical bore 52. A second piston 54 is disposed within the cylindrical bore 52 and is normally disposed in the right hand position illustrated in FIG. 3 by the action of an internal spring 56 disposed within the chamber 58 defined by the bore 52, the spring bearing against a seal 60 to force the second piston 54 to its right hand position against snap ring 62. Another snap ring 64 holds the rounded enlarged end of the push rod 14 within a hemispherical recess formed on one end of the first piston 46. The first piston also carries additional seals 66 and 68 in the location shown in FIG. 3. A second internal spring 70 is disposed within the first chamber 72 defined by the cylindrical bore 38, one end of the second spring bearing against the plug 40, and the other end bearing against the shoulder 74 formed on the first piston 46. The second piston 54 is provided with a passageway 76 which extends between the first chamber 72 and the second chamber 58.

The plug 40 is provided with a further passageway 78 which is in coaxial alignment with the passageway 76. A fitting 80 is in fluid communication with the passageway 78 and the outlet 20 and a pilot line 82 extends outwardly therefrom.

That portion of the casting 32 which defines the reservoir 34 is provided with aligned cylindrical apertures which receive a relief valve indicated generally at 84. The relief valve includes a relief valve piston 86 disposed within a housing indicated generally at 88. The housing 88 is formed of a tubular member 90 having a cylindrical bore 92, an upper plug 94 and a lower valve seat 96. The plug 94 is threaded as shown at 94a so that the relief valve may be readily assembled or disassembled to the casting 32. The cylindrical bore 92 and the first end wall 98 of plug 94 and the second end wall 100 of valve seat 96 define a cylindrical chamber in which the relief valve piston 86 may reciprocate. The upper plug 94 is provided with a bore which receives a spool 102. The lower valve seat 96 is also provided with an aperture which receives poppet valve 104. The relief valve piston 86 is counterbored and it receives a spring 106, one end of which bears against the valve seat end wall 100, and the other end bearing against an inside wall of the relief valve piston to normally bias the piston to an extended position wherein one end 108 of the piston 86 bears against the first end wall 98. A fitting 110 is received within a threaded portion of the bore in the plug 94, the fitting being in turn interconnected with pilot line 82 and the first pilot passageway 111. When the fluid within the pilot line 82 is pressurized the spool 102 will bear against the end 108 of piston 86.

As can best be seen from FIG. 4 the piston 86 has a reduced diameter portion 112. A second pilot line passageway 114 extends from one end of the tubular portion 90 to a location adjacent to the reduced diameter portion 112 and serves to place the pressure chamber 116, above the piston 86, in fluid communication with the first chamber 72 within the master cylinder assembly. As can also be seen from FIGS. 3 and 4, there is another chamber 118 disposed to the other side of the piston. Chamber 118 is in communication with reservoir 34 through ports 120. The chamber 118 includes the space below the piston when it is in its extended position shown in FIG. 3 and also includes that portion of the counterbore within the piston which is not occupied by other components. As the piston may be moved to a lowered position illustrated in FIG. 4, radial bores 122 are provided to insure that the bore within the piston may be in fluid communication with reservoir 34 through ports 120.

The poppet valve 104 has an enlarged head 124 which carries an O-ring 126. In addition, a snap ring 128 is carried by the stem portion 130 of the poppet. The stem portion 128 extending throughout the length of the bore in piston 86. A spring 132 surrounds a portion of the stem 128 and bears against one side of the snap ring 28 and a shoulder portion 134 in lower valve seat 96 and biases the poppet valve to a raised position.

The operation of the compound master brake cylinder assembly of this invention will now be described. When the force applying means is not applying any force to the master brake cylinder assembly, the master cylinder will be in the position illustrated in FIG. 3. Thus, the brake pedal 16 will be held against its stop by spring 18 and push rod 14 will be fully retracted. At this time there is negligible pressure in outlet 20 and brake lines 24. The brake shoes 26 will be spaced away from the brake drum 30. When the parts are in this position the chamber 72 will be connected to reservoir 34 through port 136 to insure that chamber 72 will be filled with brake fluid. If additional fluid is required within the reservoir 34 it can be added by removing filler plug 138.

When the force applying means 14 is initially applied it will shift the first piston 46 and the second piston 54 to the right. During this initial movement piston 54 will move with the first piston 46 (as the spring 56 maintains it against snap ring 62) and a relatively high volume of fluid will be displaced from the first chamber 72 through the passageway 78. During this portion of the operation the pressure of the fluid within chamber 72 will be the same as the pressure of the fluid within chamber 58. As the piston 46 moves to the right, fluid from the reservoir 34 may enter into the chamber behind the enlarged portion 48 through port 140. At the completion of the initial phase of the movement the reduced right hand end 142 of piston 54 will engage the seal 144 in plug 40.

Continued application of force will continue to shift piston 46 to the right as viewed in FIG. 3, but the piston 54 will no longer be able to shift. During this subsequent phase of movement, fluid must continue to be displaced from chamber 72, and it must also be displaced from chamber 58. Initially, the fluid will be displaced from chamber 72 through port 146 in the head of the piston 54, the fluid bypassing seal 60, since the flexible seal will permit such flow provided the pressure in chamber 58 does not exceed the pressure in chamber 72. Therefore, during this subsequent phase of operation fluid from chamber 72 will merge with the fluid in chamber 58 and be expelled through passageways 76 and 78 in outlet 20. During this phase of operation the brake shoes will move towards the drums, and the pressure in outlet 20 and in pilot line 82 will remain relatively low. However, when the brake shoes engage the drums pressure will rapidly build up within the system. This will cause the relief valve 84 to initially crack open. When this happens the seal 60 will flare as there will now be a higher pressure in chamber 58 than in chamber 72 and further fluid from chamber 72 will be expelled through relief valve 84.

The operation of the relief valve is based upon the following force relationship:

$$P_1A_1 + P_2A_2 = F + P_2A_1 + P_2A_3$$

where F is the combined force of springs 132 and 106, $P_1$ is the pressure in pilot line 82, $P_2$ is the pressure in pressure chamber 116, $A_1$ is the cross-sectional area of the spool 102, $A_2$ is the cross-sectional area of the piston 86, and $A_3$ is the effective cross-sectional area of the poppet valve 104. When the relief valve initially opens, that is to say when the poppet valve 104 moves downwardly a small amount through the combined action of the pressure on spool 102 and piston 86, the pressure within chamber 72 will decrease slightly. It should be noted though that the poppet valve is maintained within a balanced position as set forth by the equation above. Thus, the pressure within chamber 72 does not suddenly drop, but slowly drops as the pressure within the brake system 20, 82 builds up. Eventually though, the pressure within the pilot line 82 will reach such a point that it alone is capable of shifting the piston 86 downwardly to compress the springs 106 and 132 until the parts assume the position in FIG. 4. When the relief valve is in this position the chamber 72 is essentially at reservoir pressure.

Figure 2:
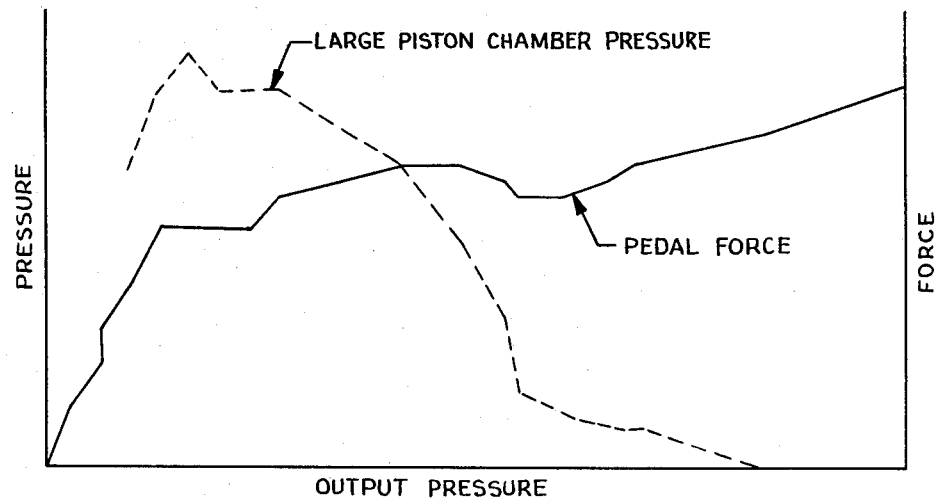
FIG. 2 is a graph illustrating a test of pedal force with respect to large piston chamber pressure.

It has been found that by using a compound master brake cylinder with relief valve 84 that pedal force will not vary substantially as the output from the compound master brake cylinder changes from combined output of the large and small pistons 46, 54 to just the output of the smaller piston 54. Thus, by slowly decreasing the pressure within the chamber 72 in response to system pressure as sensed through pilot line 82, it is possible to maintain relatively uniform brake pedal effort. This feature can be seen from FIG. 2. In addition, it should be noted that eventually the pressure of chamber 72 is decreased to reservoir pressure by fully opening the relief valve so that all of the force applied by push rod 14 is used in displacing fluid from the small diameter chamber 58 and none of it is being wasted by displacing fluid from a relief valve set at a predetermined value. The parts are so dimensioned with respect to each other that pedal effort remains fairly constant as first chamber pressure drops as rapidly as possible.

When the brake pedal 16 is released the push rod 14 and pistons 46, 54 will shift to the left towards the position shown in FIG. 3. During this movement chamber 72 can be refilled through valve 84. Thus, the force of spring 130 is selected to insure that poppet 130 is in its raised position when the pressures within reservoir 34 and chamber 72 are equal, but will permit the poppet 130 to move away from its seat, thus permitting reverse flow, when the pressure in chamber 72 is below that of reservoir 34.

While the preferred structure in which the principles of the present invention have been incorporated are shown and described above, it is to be understood that this invention is not to be limited to the particular details shown and described above, but that, in fact, widely differing means may be employed in the broader aspects of this invention.

What is claimed is:

1. A compound master brake cylinder assembly adapted for use in a hydraulic braking system, said system having braking elements connected by an outlet to said compound master brake cylinder assembly, said assembly comprising:

a fluid reservoir, a first chamber defining structure adapted to be placed in communication with the reservoir, a first piston slidable relative to said first structure, a second chamber formed within the first piston and adapted to be placed in communication with the outlet, a second piston slidable relative to said second chamber between first and second positions, force applying means capable of initially causing the first piston to move relative to the first chamber defining structure, and to subsequently cause the second piston to move relative to the second chamber, and relief valve means extending between the first chamber and reservoir and responsive to outlet pressure and first chamber pressure and capable of venting fluid from the first chamber to reservoir while progressively reducing first chamber pressure in response to progressive increase in outlet pressure above a predetermined limit whereby the force applied by the force applying means does not substantially vary while the first chamber pressure is being reduced after the outlet pressure exceeds the predetermined limit, the relief valve means including a poppet valve normally spring biased to a closed position, first pilot operated means responsive to outlet pressure, and second pilot operated means responsive to first chamber pressure, said first and second pilot operated means acting against the poppet valve to vent fluid from the first chamber.

2. The compound master brake cylinder assembly set forth in claim 1 in which the relief valve means includes a removable housing provided with first and second pilot passageways, and a piston movable within a cylindrical recess within the housing.

3. The compound master brake cylinder assembly set forth in claim 2 in which the first pilot operated means includes a pilot line extending from the outlet to the housing and in fluid communication with the first pilot passageway in the housing, and a spool disposed within the first pilot passageway.

* * * * *